United States Patent
DeLuca et al.

(10) Patent No.: US 9,053,161 B2
(45) Date of Patent: Jun. 9, 2015

(54) DATABASE TABLE FORMAT CONVERSION BASED ON USER DATA ACCESS PATTERNS IN A NETWORKED COMPUTING ENVIRONMENT

(75) Inventors: Lisa Seacat DeLuca, San Francisco, CA (US); Yu Deng, Yorktown Heights, NY (US); Jenny S. Li, Danbury, CT (US); Liangzhao Zeng, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 13/599,498

(22) Filed: Aug. 30, 2012

(65) Prior Publication Data

US 2014/0067824 A1 Mar. 6, 2014

(51) Int. Cl.
*G06F 7/00* (2006.01)
*G06F 17/30* (2006.01)

(52) U.S. Cl.
CPC ................. *G06F 17/30569* (2013.01)

(58) Field of Classification Search
CPC .................................................. G06F 17/30569
USPC ........................................................ 707/802
See application file for complete search history.

(56) References Cited

U.S. PATENT DOCUMENTS

| | | | |
|---|---|---|---|
| 7,571,173 B2 | 8/2009 | Yang et al. | |
| 8,005,866 B2 | 8/2011 | Sureka | |
| 8,037,108 B1 | 10/2011 | Chang | |
| 8,077,059 B2 | 12/2011 | Davies et al. | |
| 2004/0027350 A1* | 2/2004 | Kincaid et al. | 345/440 |
| 2004/0254924 A1* | 12/2004 | Dettinger et al. | 707/4 |
| 2005/0171966 A1 | 8/2005 | Rath et al. | |
| 2005/0278277 A1* | 12/2005 | Forlenza et al. | 707/1 |
| 2010/0257181 A1* | 10/2010 | Zhou et al. | 707/747 |
| 2012/0047107 A1 | 2/2012 | Doddavula et al. | |

OTHER PUBLICATIONS

Maitland, J., "Keeping Control Isn't Easy", Chapter 4: Cloud-Based Infrastructure, SearchCloudComputing.com, 13 pages. Publication date not cited.
Mell, P. et al., "The NIST Definition of Cloud Computing", National Institute of Standards and Technology, Information Technology Laboratory, Version 15, Oct. 7, 2009, 2 pages.

(Continued)

*Primary Examiner* — Hosain Alam
*Assistant Examiner* — Van Oberly
(74) *Attorney, Agent, or Firm* — William E. Schiesser; Keohane & D'Alessandro PLLC; Maxine L. Barasch

(57) ABSTRACT

An approach for conversion between database formats (e.g., from a relational database format to a hash table or a "big table" database format) based on user data access patterns in a networked computing environment is provided. A first set of database tables having a first format is identified based on a set of access patterns stored in a computer storage device. A second set of database tables having a second database format corresponding to the first set of database tables may then be provided (e.g., accessed, augmented, and/or generated). A mapping between the first set of database tables and the second set of database tables may then be created. A column set may then be generated based on at least one condition of the set of queries. The column set may then be used as a key for the second set of database tables.

19 Claims, 6 Drawing Sheets

(56) References Cited

OTHER PUBLICATIONS

Google: "Add mySQL to BIGTABLE Importer (including unique and constraint support!)", Issue 366, May 18, 2008, 2 pages. Multiple authors cited.

"IBM InfoSphere DataStage", www-01.bim.com., 2 pages. Publication date not cited.

Microsoft: "Move Data from Excel to Access", 2012, 2 pages. No authors cited.

* cited by examiner

DATABASE TABLE FORMAT CONVERSION BASED ON USER DATA ACCESS PATTERNS IN A NETWORKED COMPUTING ENVIRONMENT

TECHNICAL FIELD

In general, the present invention relates to database table format conversion. Specifically, embodiments of the present invention relate to generation of a hash table (a.k.a., "big table") database table from one or more relational database tables based on user access patterns (e.g., queries, insertions, updates or deletions) in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud computing models provide a convenient tool for application hosting. Challenges may exist, however, in applying cloud computing models to database architectures because many databases hosted in cloud environments follow a tabular database model. That is, a traditional relational database model may not be applicable in designing an application that is to be hosted in a cloud environment. Accordingly, it often falls upon a user/customer to comprehend the concepts involved with a tabular database format. As such, conversion from a relational database format to a tabular database format is often performed manually, which can be time consuming and prone to error.

SUMMARY

In general, embodiments of the present invention relate to approaches for conversion between database formats (e.g., from a relational database format to a hash table or a "big table" database format) based on user data access patterns (e.g., a set of queries, insertions, updates, or deletions) in a networked computing environment (e.g., a cloud computing environment). In a typical embodiment, a first set of database tables having a first format is identified based on a set of access patterns stored in a computer storage device. A second set of database tables having a second database format corresponding to the first set of database tables may then be provided (e.g., accessed, augmented and/or generated). A mapping between the first set of database tables and the second set of database tables may then be created. A column set may then be generated based on at least one condition of the set of access patterns. The column set may then be used as a key for the second set of database tables.

A first aspect of the present invention provides a computer-implemented method for converting database formats based on user data access patterns in a networked computing environment, comprising: identifying a first set of database tables based on a set of access patterns stored in a computer storage device, the first set of database tables having a first format, and the set of access patterns indicating a set of user data queries, insertions, updates or deletions to data stored in the first set of database tables; providing a second set of database tables having a second database format corresponding to the first set of database tables; creating a mapping between the first set of database tables and the second set of database tables; and generating a key for the second set of database tables based on at least one condition of the set of access patterns.

A second aspect of the present invention provides a system for converting database formats based on user data access patterns in a networked computing environment, comprising: a memory medium comprising instructions; a bus coupled to the memory medium; and a processor coupled to the bus that when executing the instructions causes the system to: identify a first set of database tables based on a set of queries stored in a computer storage device, the first set of database tables having a first format, and the set of access patterns indicating a set of user data queries, insertions, updates or deletions to data stored in the first set of database tables; provide a second set of database tables having a second database format corresponding to the first set of database tables; create a mapping between the first set of database tables and the second set of database tables; and generate a key for the second set of database tables based on at least one condition of the set of access patterns.

A third aspect of the present invention provides a computer program product for converting database formats based on user data access patterns in a networked computing environment, the computer program product comprising a computer readable storage media, and program instructions stored on the computer readable storage media, to: identify a first set of database tables based on a set of access patterns stored in a computer storage device, the first set of database tables having a first format, and the set of access patterns indicating a set of user data queries, insertions, updates or deletions to data stored in the first set of database tables; provide a second set of database tables having a second database format corresponding to the first set of database tables; create a mapping between the first set of database tables and the second set of database tables; and generate a key for the second set of database tables based on at least one condition of the set of access patterns.

A fourth aspect of the present invention provides a method for deploying a system for converting database formats based on user data access patterns in a networked computing environment, comprising: providing a computer infrastructure being operable to: identify a first set of database tables based on a set of access patterns stored in a computer storage device, the first set of database tables having a first format, and the set of access patterns indicating a set of user data queries, insertions, updates or deletions to data stored in the first set of database tables; provide a second set of database tables having a second database format corresponding to the first set of database tables; create a mapping between the first set of database tables and the second set of database tables; and generate a key for the second set of database tables based on at least one condition of the set of access patterns.

BRIEF DESCRIPTION OF THE DRAWINGS

These and other features of this invention will be more readily understood from the following detailed description of the various aspects of the invention taken in conjunction with the accompanying drawings in which.

Figure 1:
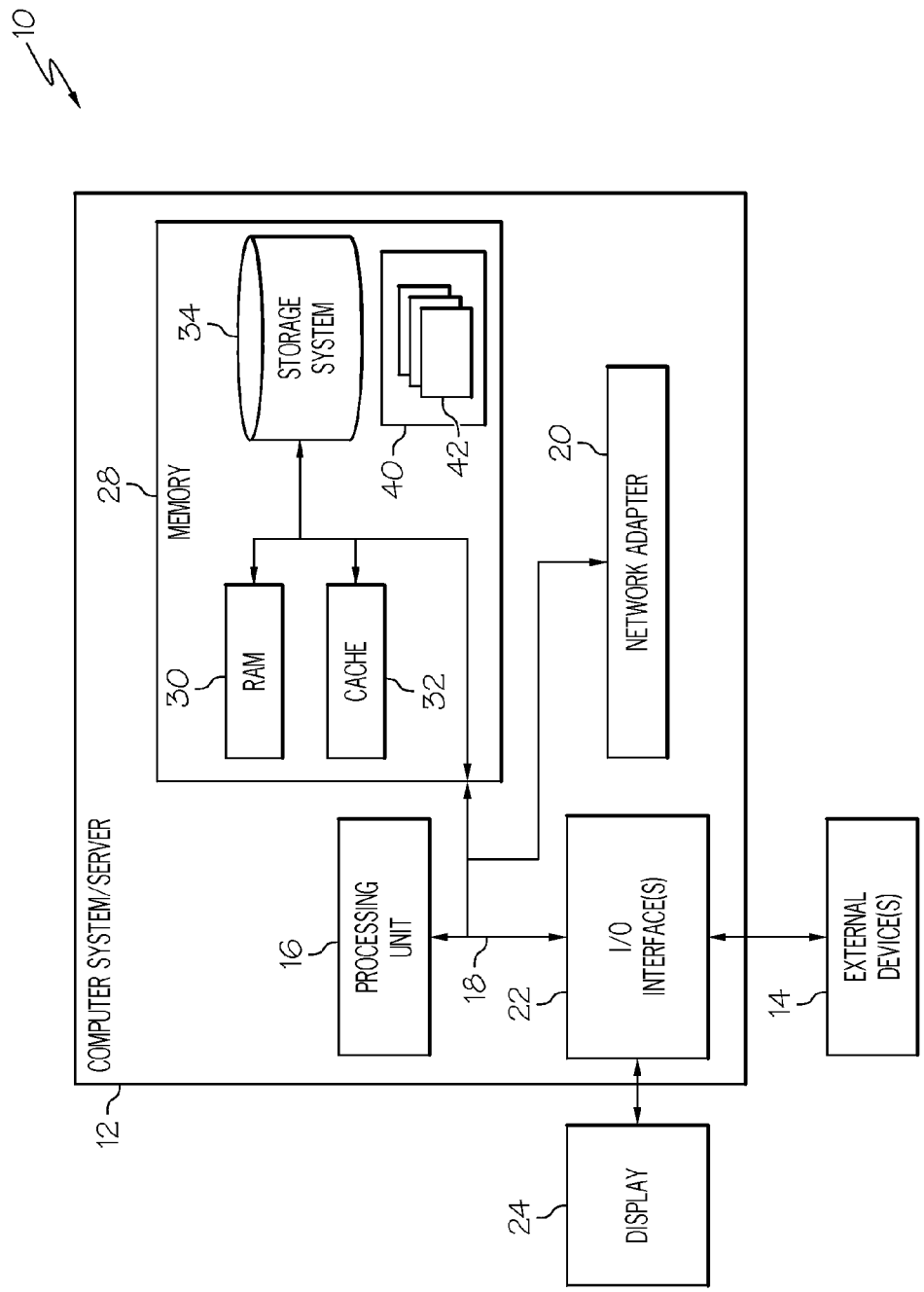
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention relate to approaches for conversion between database formats (e.g., from a relational database format to a hash table or a "big table" database format) based on user data access patterns (e.g., a set of queries) in a networked computing environment (e.g., a cloud computing environment). In a typical embodiment, a first set of database tables having a first format is identified based on a set of access patterns stored in a computer storage device. A second set of database tables having a second database format corresponding to the first set of database tables may then be provided (e.g., accessed, augmented and/or generated). A mapping between the first set of database tables and the second set of database tables may then be created. A column set may then be generated based on at least one condition of the set of access patterns. The column set may then be used as a key for the second set of database tables.

In general, a hash table or "big table" database format maps two arbitrary string values (e.g., row key and column key) and timestamp (hence a three dimensional mapping) into an associated arbitrary byte array. The big table format may be defined as a sparse, distributed multi-dimensional sorted map. A big table format is generally designed to scale across a high volume of machines and make it more convenient to add more machines without significant reconfiguration. Each table may have multiple dimensions (e.g., one of which is a field for time to allow for versioning and "garbage" collection). Tables may be optimized for various file systems by being split into multiple tablets (e.g., segments of the tables may be split along a row chosen such that the tablet will be a certain size (e.g., about 200 megabytes).

When sizes of tables have a potential to grow beyond a specified limit, the tablets may compressed using various algorithms (e.g., BMDiff, the Zippy compression algorithm (open-sourced as Snappy). Locations in tablets may be recorded as database entries in multiple special tablets, which are called "META1" tablets. META1 tablets may be found by querying a "META0" tablet, which typically resides on a server of its own since it may often be queried by clients as to the location of the "META1" tablet. Along these lines, the META0 server is not generally a bottleneck, since the processor time and bandwidth necessary to discover and transmit META1 locations is typically minimal, and clients may cache locations to minimize queries.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
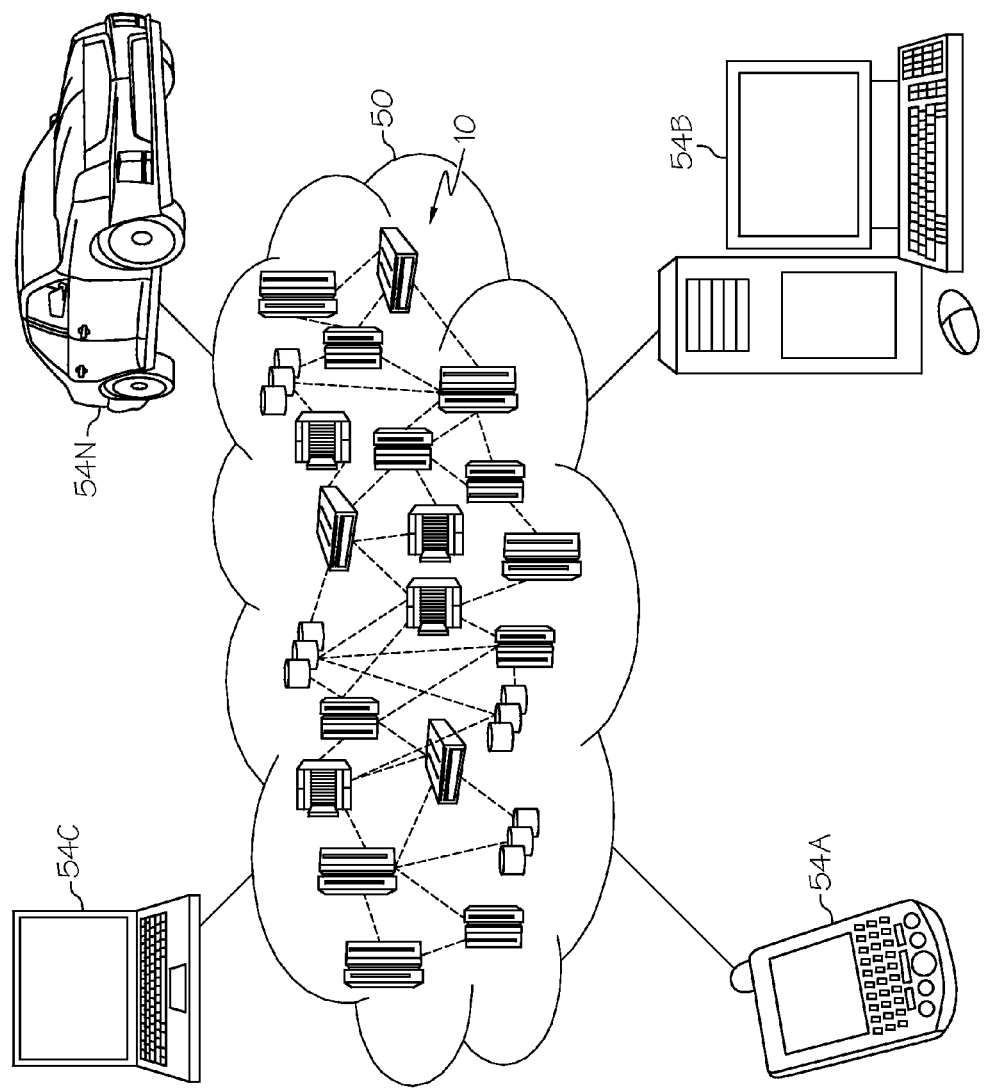
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
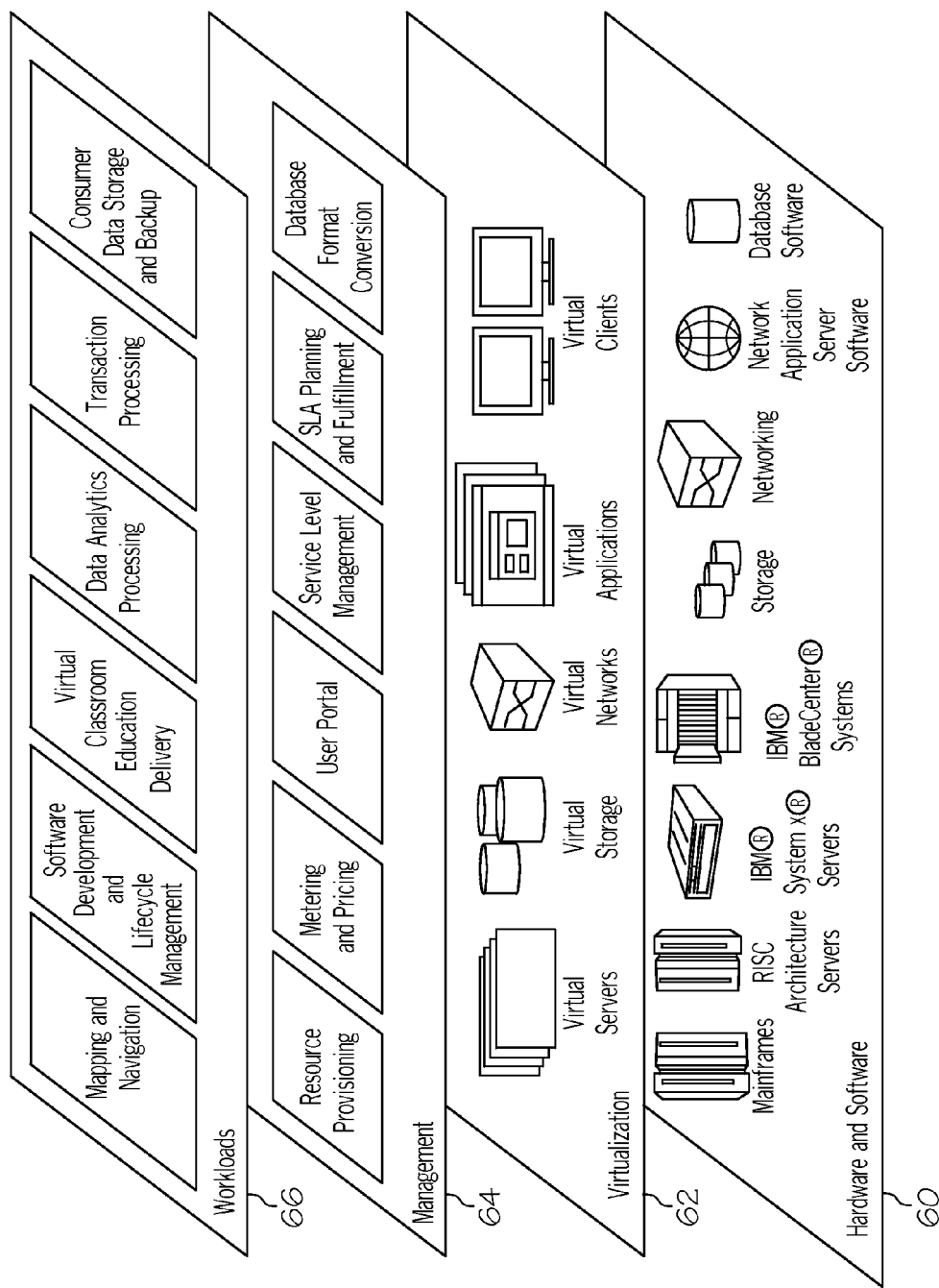
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is database format conversion, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the database format conversion functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, embodiments of the present invention enable big table creation based on a relational database model (e.g., expressed in a ddl or xml schema file) and data access patterns. In general, the embodiments of the present invention will leverage users data access patterns (e.g., queries, insertions, updates or deletions) to create big tables. That is, data (from table and joints) involved in queries, insertions, updates or deletions is examined/analyzed and used to construct big tables.

Figure 4:
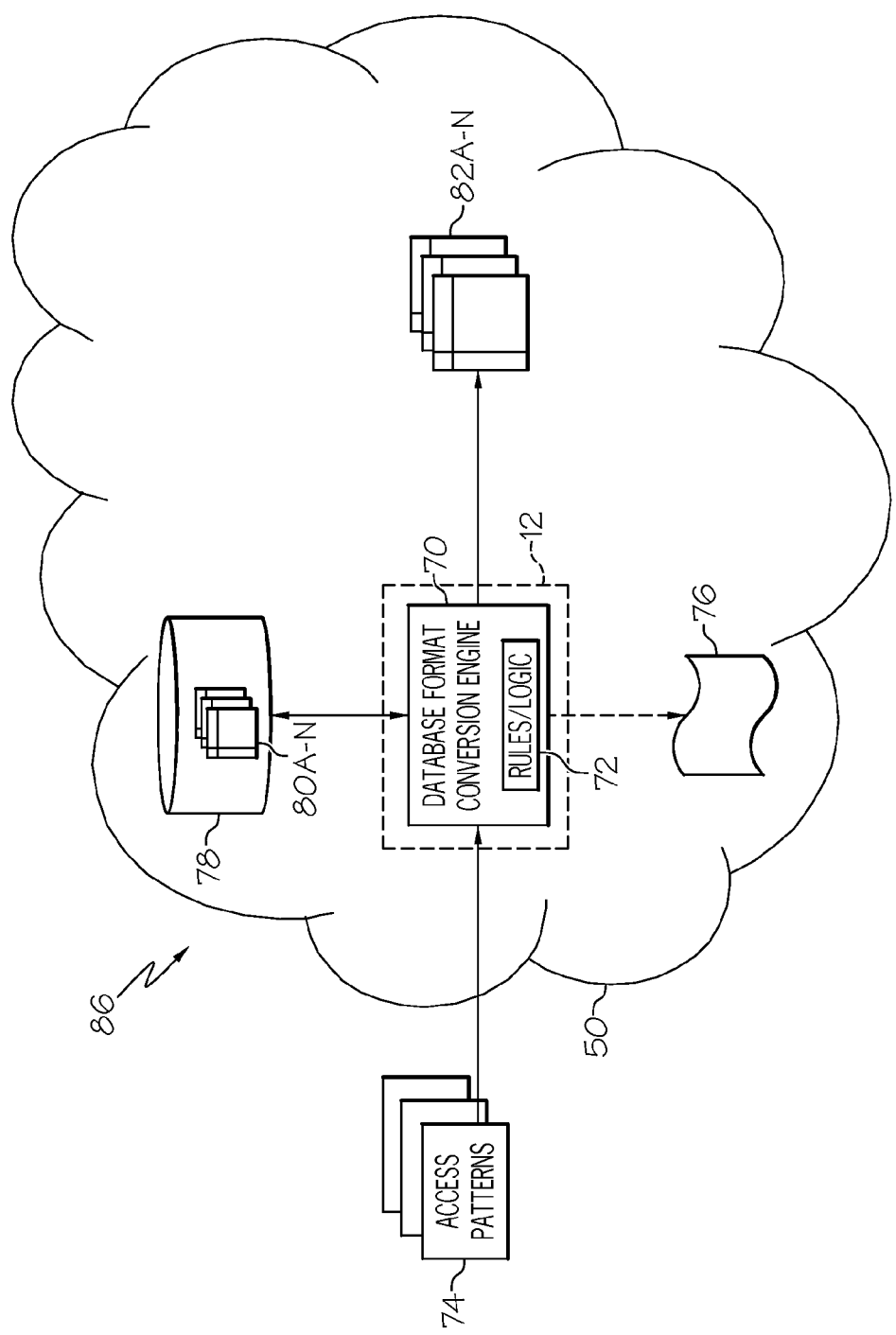
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system is shown in FIG. 4. In the event the teachings recited herein are practiced in a networked computing environment 86, each client need not have a database format conversion engine (engine 70). Rather, engine 70 could be loaded on a server or server-capable device that communicates (e.g., wirelessly) with the clients to provide database format conversion therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides database format conversion hereunder.

Along these lines, engine 70 may perform multiple functions similar to a general-purpose computer. Specifically, among other functions, engine 70 may (among other things): identify a first set of database tables 80A-N (e.g., stored in one or more computer storage devices 78) having a first format (e.g., a relational database) based on a set of access patterns 74A-N (e.g., although not shown, set of access patterns 74A-N may also stored and/or accessed from one or more computer storage devices), the set of access patterns 74A-N a set of user data queries, insertions, updates, and/or deletions to data stored in first set of database tables 80A-N; provide a second set of database tables 82A-N having a second database format (e.g., a big/hash table database format) corresponding to the first set of database tables 80A-N; generate a set of de-normalized tables from the first set of database tables 80A-N; augment at least one table of the first set of database tables 80A-N to yield the second set of database tables 82A-N; create a mapping 76 between the first set of database tables 80A-N and the second set of database tables 82A-N; generate a key for the second set of database tables based on at least one condition of the set of access patterns; generate a column set based on at least one condition of the set of access patterns 74A-N; use the column set as a key for the second set of database tables 82A-N; and/or propagate at least one data operation (e.g., a data deletion operation, a data insertion operation, etc.) to the second set of database tables 82A-N based on at least one of: the key, the mapping, or the at least one condition.

Figure 5:
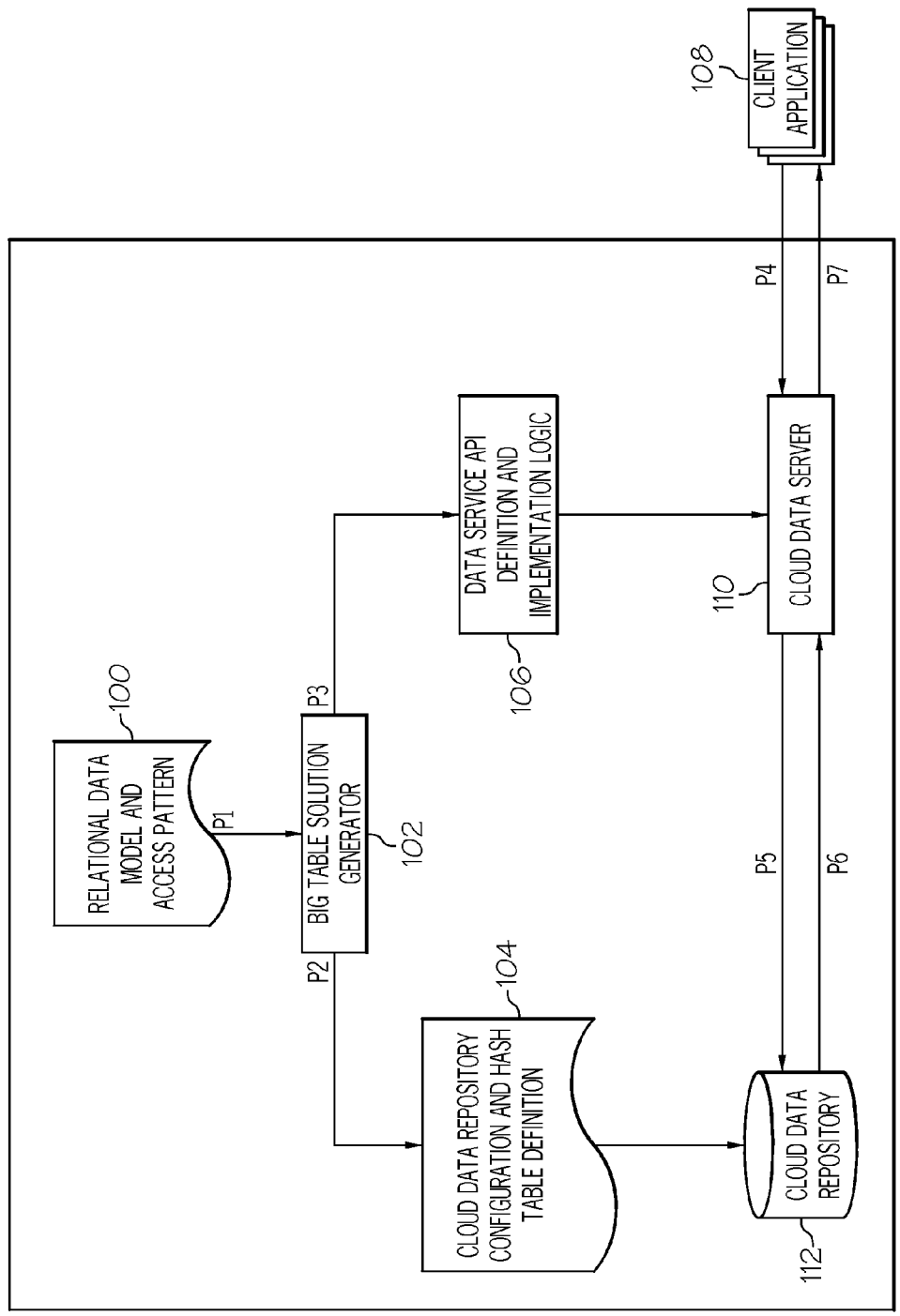
FIG. 5 depicts a process/component flow diagram according to an embodiment of the present invention.

Referring now to FIG. 5, a component flow diagram according to one embodiment of the present invention is shown. It is understood in advance that one or more of the components shown in FIG. 5 may be implemented via or in conjunction with any of the components of FIGS. 1-4 (e.g., program 40 of FIG. 1, engine 70 and/or computer storage device 78 of FIG. 4, etc.) Regardless, as shown, FIG. 5 generally shows the following components:

Relational data model and access pattern 100: A relational data model can be represented by data definition language (DDL). Access patterns generally represents one or more operations against the relational data model (e.g., queries, data insert operations, data update operations, data deletion operations, etc.)

Big table solution generator 102: By taking the relational data model and the access pattern as input, two or more objects may generated such as: a cloud data table repository configuration and hash table definition 104 that defines big table name, table structure (e.g. hash table definition, key definition, etc.); and/or a data service application programming interface (API) definition and implementation logic 106 (e.g., a method and/or logic that implements the access pattern).

Cloud data server 110: By deploying data service API definition and implementation logic 106, cloud data server 110 may provide a data service for one or more client applications 108. Such service may include operations that are described in the access pattern.

Cloud data repository 112: A computer storage device that contains data that client applications utilize.

In general, the process through components of FIG. 5 may proceed as follows:

Step P1: Based on relational data model and access patterns 100, big table solution generator 102 may create cloud data repository configuration and hash table definition 104 and data service API definition and implementation logic 106.

Step P2: Cloud data repository configuration and hash table definition 104 is deployed into cloud data repository 112.

Step P3: Data service API definition and implementation logic 106 is deployed into cloud data server 110.

Step P4: Client application 108 issues a data service request through APIs deployed in cloud data server 110.

Step P5: Cloud data server 110 facilitates access to data stored in cloud data repository 112.

Step P6: Cloud data repository 112 communicates requested data to cloud data server 110.

Step P7: Cloud data server 110 returns a service request result to client application 108.

ILLUSTRATIVE EXAMPLE

This section will describe an illustrative algorithm/process for carrying out at least one embodiment of the present invention. The algorithm will utilize the following input and/or output:
INPUT: ER model and access pattern (e.g. queries, insertions, updates, or deletions, etc.)
OUTPUT: big table model
Step 1:
FOR each query,
  (1) Identify the corresponding relational tables based on the tables specified in the "FROM" clause.
    (1.1) IF an existing big table covers the identified relational tables, go to step (2).
    (1.2) IF an existing big table partially covers the identified relational tables, e.g., the big/hash table is formed by Table A joined with Table B, the identified relational tables include Table A, Table B and Table C, then the existing big table should be augmented by the identified tables that have not been covered, such as Table C.
    (1.3) OTHERWISE, generate a de-normalized table out of these identified relational tables, which form a new big table.
  In addition, the mapping between each of the identified relational tables and the updated or newly generated big table is created.

(2) Create a column family for the columns mentioned in the specified query conditions, including "=", ">", "<" conditions. In addition, corresponding secondary indices are needed to ensure search performance. For example, in a condition like "StudentID='001'", an secondary index should be built on the column StudentID (3) Utilize the column family as the key for the big table. It may be noted that at the end of this step, if a relational database table has not been mapped to a big table, then a big table with that table will be created and the corresponding mapping will be created.

Step 2:
FOR each delete operation:
(1) Identify the mapped big tables for the involved relational table in the delete operation.
(2) FOR each big table, check the condition of the delete operation
  (2.1) IF the key to access the big table can support the condition running, go to the next big table;
  (2.2) ELSE create a key to access the big table as described in Step 1 above.

It may be noted that once the mapping is created, one or more data operations may be inserted as follows:
FOR each insert operation:
(1) Identify the mapped big tables for the involved relational table in the insert operation.
(2) FOR each identified big table
  (2.1) FOR each record in the big table, check the compatibility between the to-be-inserted record and the big table record. For example, suppose this big table is formed by the join between Table A and Table B, the join condition is A.StudentID=B.StudentID. Suppose now we need to insert a record into Table A. Then we need to check if the StudentID column in newly inserted record has the same value as the StudentID field in the big table record. IF they are compatible, then we can insert a new record into the big table with the to-be-inserted record joined with the rest of the fields in the big table record.
  (2.2) IF there is no record in the big table which is compatible with the to-be-inserted record, we will add a new record into the big table with only the fields from the to-be-inserted record.

Update can be done by a delete and an insert, so its operation is similar to insertion and deletion.

Figure 6:
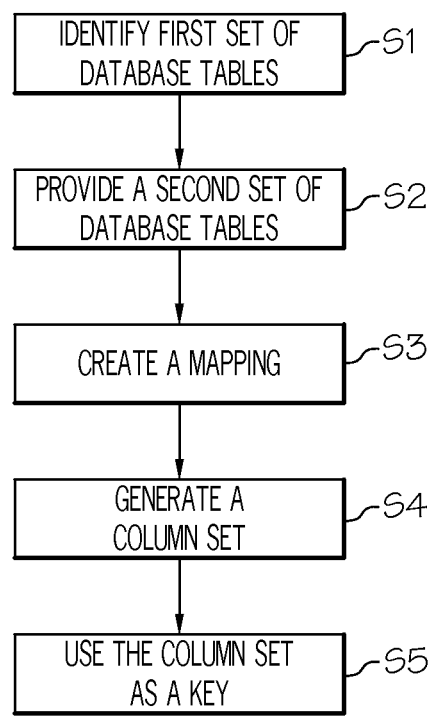
FIG. 6 depicts a method flow diagram according to an embodiment of the present invention.

Referring now to FIG. 6, a method flow diagram according to an embodiment of the present invention is shown. In step S1, a first set of database tables having a first format (e.g., a relational database format) based on a set of user access patterns stored in a computer storage device is identified (e.g., the set of user access patterns indicating a set of user data retrieval operations to data stored in the first set of database tables). In step S2, a second set of database tables having a second database format (e.g., big table format) corresponding to the first set of database tables is provided. In step S3, a mapping between the first set of database tables and the second set of database tables is created. In step S4, a column set is generated based on at least one condition of the set of user access patterns. In step S5, the column set is used as a key for the second set of database tables.

While shown and described herein as a database format conversion solution, it is understood that the invention further provides various alternative embodiments. For example, in one embodiment, the invention provides a computer-readable/useable medium that includes computer program code to enable a computer infrastructure to provide database format conversion functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide database format conversion functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for database format conversion. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for converting database formats based on user data access patterns in a cloud computing environment, comprising:
    receiving the set of user data access patterns from a client through a cloud network;
    storing the set of user data access patterns in a computer storage device;
    generating a data service application programming interface (API) definition and implementation logic that implements the set of data access patterns;
    deploying, by a cloud data server, the API definition and implementation logic to perform operations specified by the set of data access patterns;
    identifying a first set of database tables based on the set of user data access patterns stored in the computer storage device, the first set of database tables having a first format, and the set of access patterns indicating a set of user data queries, insertions, updates or deletions to data stored in the first set of database tables;
    providing a cloud data repository and a second set of database tables having a second database format corresponding to the first set of database tables;
    creating a mapping between the first set of database tables and the second set of database tables; and
    generating a key for the second set of database tables based on at least one condition of the set of access patterns,
    performing, for the first set of database tables, at least one operation specified by the set of data access patterns;
    propagating the at least one data operation to the second set of database tables based on at least one of: the key, the mapping, or the at least one condition;
    wherein the cloud computing environment comprises a shared pool of configurable computing resources that can be rapidly provisioned and released.

2. The computer-implemented method of claim 1, the first format being a relational database format, and the second format being a hash table format.

3. The computer-implemented method of claim 1, the generating comprising:
    generating a column set based on the at least one condition of the set of access patterns; and
    using the column set as a key for the second set of database tables.

4. The computer-implemented method of claim 1, the providing comprising generating a set of de-normalized tables from the first set of database tables.

5. The computer-implemented method of claim 1, the providing comprising augmenting at least one table of the first set of database tables to yield the second set of database tables.

6. The computer-implemented method of claim 1, the at least one data operation being at least one of: a data query operation, a data update operation, a data deletion operation, or a data insertion operation.

7. A system for converting database formats based on user data access patterns in a cloud computing environment, comprising:
    a memory medium comprising instructions;
    a bus coupled to the memory medium; and
    a processor coupled to the bus that when executing the instructions causes the system to:
        receive the set of user data access patterns from a client through a cloud network;
        store the set of user data access patterns in a computer storage device;
        generate a data service application programming interface (API) definition and implementation logic that implements the set of data access patterns;
        deploy, by a cloud data server, the API definition and implementation logic to perform operations specified by the set of data access patterns;
        identify a first set of database tables based on the set of user data access patterns stored in the computer storage device, the first set of database tables having a first format, and the set of access patterns indicating a set of user data queries, insertions, updates or deletions to data stored in the first set of database tables;
        provide a cloud data repository and a second set of database tables having a second database format corresponding to the first set of database tables;
        create a mapping between the first set of database tables and the second set of database tables; and
        generate a key for the second set of database tables based on at least one condition of the set of access patterns,
        perform, for the first set of database tables, at least one operation specified by the set of data access patterns;
        propagate the at least one data operation to the second set of database tables based on at least one of: the key, the mapping, or the at least one condition;
        wherein the cloud computing environment comprises a shared pool of configurable computing resources that can be rapidly provisioned and released.

8. The system of claim 7, the first format being a relational database format, and the second format being a hash table format.

9. The system of claim 7, the memory medium further comprising instructions for causing the system to:
    generate a column set based on the at least one condition of the set of access patterns; and
    use the column set as a key for the second set of database tables.

10. The system of claim 7, the memory medium further comprising instructions for causing the system to generate a set of de-normalized tables from the first set of database tables.

11. The system of claim 7, the memory medium further comprising instructions for causing the system to augment at least one table of the first set of database tables to yield the second set of database tables.

12. The system of claim 7, the at least one data operation being at least one of: a data query operation, a data update operation, a data deletion operation, or a data insertion operation.

13. A computer program product for converting database formats based on user data access patterns in a cloud computing environment, the computer program product comprising a non-transitory computer readable storage device, and program instructions stored on the non-transitory computer readable storage device, to:
    receive the set of user data access patterns from a client through a cloud network;

store the set of user data access patterns in a computer storage device;

generate a data service application programming interface (API) definition and implementation logic that implements the set of data access patterns;

deploy, by a cloud data server, the API definition and implementation logic to perform operations specified by the set of data access patterns;

identify a first set of database tables based on the set of user data access patterns stored in the computer storage device, the first set of database tables having a first format, and the set of access patterns indicating a set of user data queries, insertions, updates or deletions to data stored in the first set of database tables;

provide a cloud data repository and a second set of database tables having a second database format corresponding to the first set of database tables;

create a mapping between the first set of database tables and the second set of database tables; and generate a key for the second set of database tables based on at least one condition of the set of access patterns, perform, for the first set of database tables, at least one operation specified by the set of data access patterns;

propagate the at least one data operation to the second set of database tables based on at least one of: the key, the mapping, or the at least one condition;

wherein the cloud computing environment comprises a shared pool of configurable computing resources that can be rapidly provisioned and released.

14. The computer program product of claim 13, the first format being a relational database format, and the second format being a big table format.

15. The computer program product of claim 13, the non-transitory computer readable storage device further comprising instructions to:

generate a column set based on the at least one condition of the set of access patterns; and use the column set as a key for the second set of database tables.

16. The computer program product of claim 13, the non-transitory computer readable storage device further comprising instructions to generate a set of de-normalized tables from the first set of database tables.

17. The computer program product of claim 13, the non-transitory computer readable storage device further comprising instructions to augment at least one table of the first set of database tables to yield the second set of database tables.

18. The computer program product of claim 13, the at least one data operation being at least one of: a data query operation, a data update operation, a data deletion operation, or a data insertion operation.

19. A method for deploying a system for converting database formats based on user data access patterns in a cloud computing environment, comprising:

providing a computer infrastructure being operable to:

receive the set of user data access patterns from a client through a cloud network;

store the set of user data access patterns in a computer storage device;

generate a data service application programming interface (API) definition and implementation logic that implements the set of data access patterns;

deploy, by a cloud data server, the API definition and implementation logic to perform operations specified by the set of data access patterns;

identify a first set of database tables based on the set of user data access patterns stored in the computer storage device, the first set of database tables having a first format, and the set of access patterns indicating a set of user data queries, insertions, updates or deletions to data stored in the first set of database tables;

provide a cloud data repository and a second set of database tables having a second database format corresponding to the first set of database tables;

create a mapping between the first set of database tables and the second set of database tables; and generate a key for the second set of database tables based on at least one condition of the set of access patterns, perform, for the first set of database tables, at least one operation specified by the set of data access patterns;

propagate the at least one data operation to the second set of database tables based on at least one of: the key, the mapping, or the at least one condition;

wherein the cloud computing environment comprises a shared pool of configurable computing resources that can be rapidly provisioned and released.

* * * * *